United States Patent
Scag et al.

[11] Patent Number: 5,809,756
[45] Date of Patent: Sep. 22, 1998

[54] LAWN MOWER USABLE IN BOTH RIDING AND WALK-BEHIND MODES

[76] Inventors: Dane T. Scag, P.O. Box 766, Elm Grove, Wis. 53122; Joseph E. Berrois, 975 N.W. 114th Ave., Coral Springs, Fla. 33071

[21] Appl. No.: 713,076

[22] Filed: Sep. 12, 1996

Related U.S. Application Data

[63] Continuation-in-part of Ser. No. 336,378, Nov. 8, 1994, Pat. No. 5,653,466.

[51] Int. Cl.⁶ .................................................. A01D 34/68
[52] U.S. Cl. ........................... 56/10.8; 56/14.7; 56/16.7; 56/DIG. 9; 280/32.7
[58] Field of Search .................................. 56/10.8, 14.7, 56/16.7, DIG. 9, DIG. 14; 180/19.1, 19.3, 326; 280/32.7, 87.041, 32.5; 172/433

[56] References Cited

U.S. PATENT DOCUMENTS

| | | | |
|---|---|---|---|
| 3,485,314 | 12/1969 | Herr . | |
| 3,816,985 | 6/1974 | Sorenson et al. | 56/7 |
| 4,828,282 | 5/1989 | Pinto | 280/32.7 |
| 4,878,339 | 11/1989 | Marier et al. | 56/14.7 |
| 4,879,867 | 11/1989 | Wenzel | 56/11.1 |
| 4,920,733 | 5/1990 | Berrios | 56/10.9 |
| 4,920,734 | 5/1990 | Wenzel | 56/11.1 |
| 4,989,351 | 2/1991 | Shear | 180/11 X |
| 5,117,944 | 6/1992 | Hurtevent | 187/9 |
| 5,507,138 | 4/1996 | Wright et al. | 56/14.7 |
| 5,575,140 | 11/1996 | Bermes et al. | 56/14.7 |
| 5,600,944 | 2/1997 | Wright et al. | 56/14.7 |

FOREIGN PATENT DOCUMENTS 405097049  4/1993  Japan .

Primary Examiner—Terry Lee Melius
Attorney, Agent, or Firm—Brian G. Gilpin; Godfrey & Kahn, S.C.

[57] ABSTRACT

A powered lawn mower having a frame, an engine mounted to the frame, a set of front wheels and rear wheels connected to the frame, a drive for transmitting rotational power from the engine to the rear wheels, and grass cutting blades associated with the frame, and powered by the engine. A platform is positioned behind the rear wheels, and is capable of supporting an operator while the lawn mower is operating. The platform and the other parts are connected to the frame in such a way and positioned so that the addition of the operator in a stand-up or riding position moves the center of gravity by no more than twenty-five percent of the wheelbase of the mower. The rear wheel set may be positioned up or down but is not swingable. Alternatively, the platform and the other parts are connected to the frame in such a way and positioned so that the total weight of the mower is distributed no more than thirty-five percent on the front wheels with no operator on the platform, and the total weight of the mower is no less than twenty percent on the front wheels with an average operator riding on the platform.

29 Claims, 2 Drawing Sheets

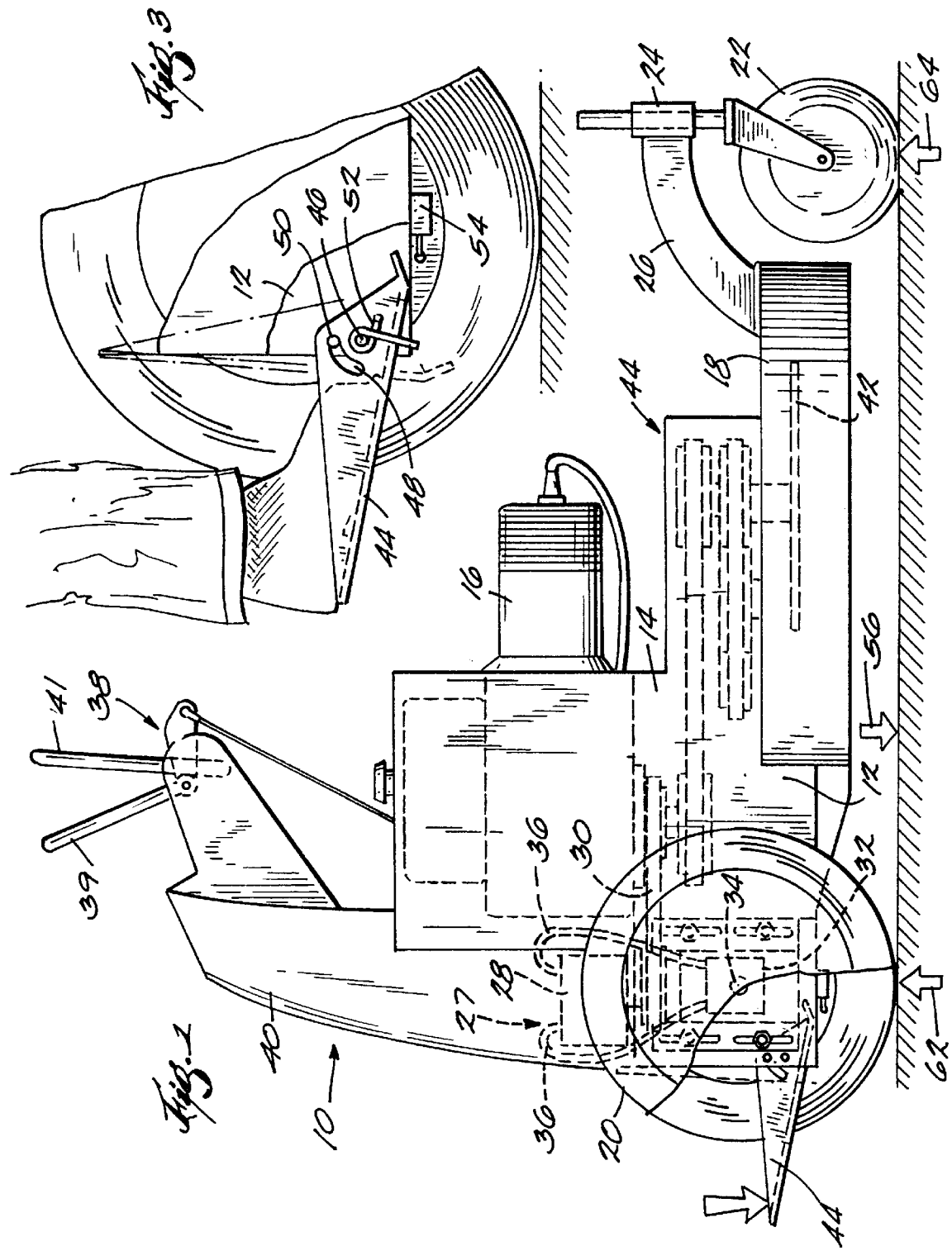

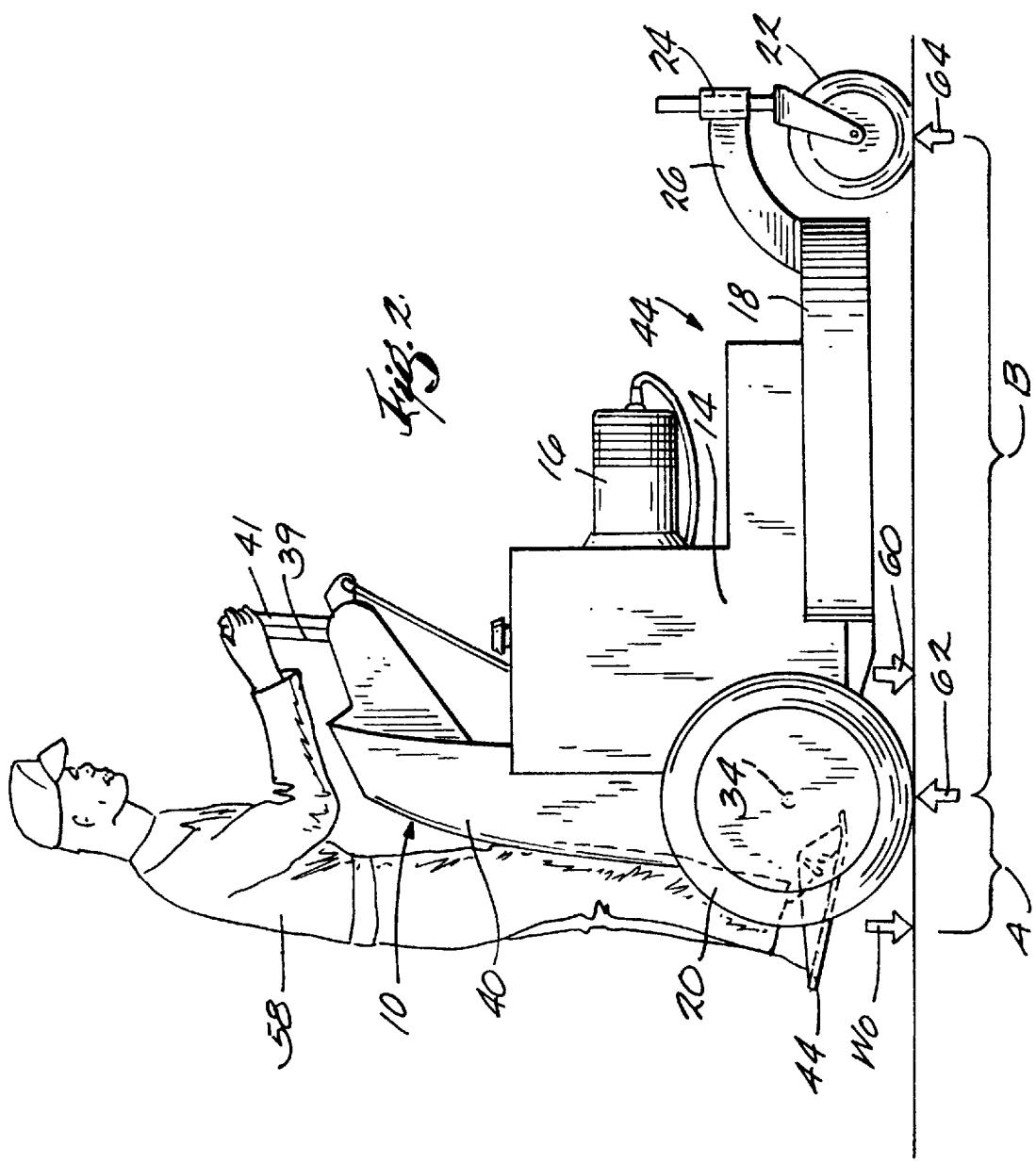

LAWN MOWER USABLE IN BOTH RIDING AND WALK-BEHIND MODES

CROSS REFERENCE TO RELATED APPLICATION

This application is a continuation-in-part of U.S. patent application Ser. No. 336,378, filed on Nov. 8, 1994, now U.S. Pat. No. 5,653,466 issued on Aug. 5, 1997.

BACKGROUND OF THE INVENTION

This invention relates to powered lawn mowers, and in particular to self-propelled lawn mowers that can accommodate an operator operating the mower from a position walking behind the machine as well as an operator operating the mower from a position standing on the machine.

Most current lawn mowers designed for commercial lawn cutters are either dedicated walk-behind machines or conventional riding machines. The commercial riding machines currently available are generally large, heavy, and costly, and this high cost can be justified only by a few of the lawn cutting contractors. One example of such a riding lawn mower is shown in Yamaoka et al, U.S. Pat. No. 4,809,796. Besides their cost, conventional riding mowers pay a penalty in the area of gross weight and maneuverability, at least partly because of their physical size.

Partly because of the expense of these riding lawn mowers, many lawn service contractors opt for the walk-behind mowers. While less expensive, these walk-behinds, being self-powered, are still capable of cutting large areas of grass. And being physically smaller than conventional riding lawn mowers, they are also more maneuverable. One example of such a self-powered walk-behind lawn mower is shown in Berrios, U.S. Pat. No. 4,920,733. While this design is in general a good design and a great improvement over what existed before, it still requires the operator to walk the entire area of the grass being cut, which can be an exhausting experience over the period of a full work day even if the mower is indeed self-powered. Some operators attach a riding sulky to reduce walking effort, but this arrangement results in substantially reduced maneuverability.

It is known that the ground loading of the front, caster-type wheels is critical, whether on a riding machine or a walk behind machine. It is critical that the front wheel loading be not less than twenty percent, and not be more than thirty-five percent. Some of the reasons that this weight distribution is critical are: a) to avoid excessive parasitic drag when turning the machine, especially when turning uphill; b) to have stability when moving up or down a steep slope; c) to be reasonably stable when moving over undulating ground; d) to minimize tipping of the machine when accelerating from full stop; and e) to maintain a uniform quality of cut.

A lawn mower convertible between a walk-behind mower and a stand-up riding mower is disclosed in Marier et al, U.S. Pat. No. 4,878,339. Because of the criticality of the ground loading of the front wheels, as described above, such a convertible unit is excessively complex, including as it does the provision to swing the rear wheel assembly from a position under the engine, for walk-behind operation, to a position substantially behind the engine, for riding operation. This extreme complexity results in substantially reduced reliability, and greatly increased parts count. What is needed, rather, is a machine that can be used in both walk-behind and rider modes, without the expensive and complex conversion required by Marier et al.

This invention relates to improvements over the apparatus described above, and to solutions to some of the problems raised or not solved thereby.

SUMMARY OF THE INVENTION

The invention provides a powered lawn mower having a frame, a prime mover mounted to the frame, a set of one or more front wheels and one or more rear wheels connected to the frame, drive means for transmitting rotational power from the prime mover to at least one of the rear wheels, and grass cutting blades associated with the frame, and powered by the prime mover. The rear wheel set is mounted to the frame so as to prevent horizontal movement, while allowing a certain limited amount of vertical movement, and is not swingable. According to the invention, a platform is positioned behind the rear wheels. This platform is capable of supporting an operator while the lawn mower is operating. The platform and the other parts are connected to the frame in such a way and positioned so that the addition of the operator moves the center of gravity by no more than twenty-five percent of the wheelbase of the mower. Alternatively, the platform and the other parts are connected to the frame in such a way and positioned so that the total weight of the mower is distributed no more than thirty-five percent on the front wheel or wheels with no operator on the platform, and the total weight of the mower is no less than twenty percent on the front wheels with an average operator riding on the platform.

In one embodiment, the platform is pivotably mounted to the lawn mower, and pivots between a stowed position and a deployed position, and includes means to spring bias the platform toward the stowed position. An interlock may also be provided, causing the ground travel and/or cutter blades to stop if the platform moves more than a predetermined amount away from the deployed position toward the stowed position.

The present invention provides many advantages over lawn mowers of the prior art. In particular, the operator will be less fatigued, not having to walk all day long while mowing. A machine constructed according to the invention can be operated at higher ground speeds, since it is not limited to a human being's walking speed. Properly equipped, the machine will have true zero turning radius capability, since the mower can turn within its own overall diameter. This capability eliminates uncut grass at the ends of cutting rows. The machine is more compact than conventional riders, reducing scalping of the turf, and providing easier loading and unloading, especially with other equipment on a trailer. Such a machine would weigh substantially less and cost substantially less than conventional riding machines, or even than a conventional walk-behind machine when combined with a sulky. When negotiating a slope, the operator can easily step off an appropriately equipped machine constructed according to a preferred embodiment of this invention, and operate the machine while walking behind.

Other objects and advantages of the invention will become apparent hereinafter.

DESCRIPTION OF THE DRAWING

FIG. 1 is a side elevational view of a powered lawn mower constructed according to a preferred embodiment of the invention.

FIG. 2 is a side elevational view of the powered lawn mower shown in FIG. 1, showing an operator mounted on the mower.

FIG. 3 is a fragmentary side elevational view, on an enlarged scale, of the platform of the lawn mower shown in FIG. 1.

DESCRIPTION OF THE PREFERRED EMBODIMENTS

Referring now to FIG. 1, there is shown a lawn mower 10 constructed according to a preferred embodiment of the invention. The lawn mower 10 includes a frame 12, to which the other parts are attached, as will be set forth presently. In this embodiment the frame 12 includes an engine mount portion 14, to which a prime mover 16, such as an electric motor or an internal combustion engine, is mounted. Beneath and forward of the engine mount portion 14 of the frame is the cutting deck or mower deck 18, which in this embodiment also forms a part of the frame 12.

The lawn mower 10 further includes at least one rear wheel 20, and at least one front wheel 22, requiring of course at least two of one and one of the other for a total of at least three wheels, for stability. The embodiment shown is a four-wheel machine, the two front wheels 22 being the directional wheels, mounted by means of a swivel 24 and a bracket 26 to the front of the mower deck 18, so as to act as caster wheels. The two rear wheels 20 are drive wheels in this embodiment. Power from the engine 16 can be applied to rear wheels 20 by any suitable drive means or other means 27 for transmitting rotational power to the wheels.

The invention generally provides means for steering the lawn mower. The particular embodiment shown is provided with two hydraulic pumps 28 driven by the engine 16 by means of a belt 30. Two hydraulic motors 32 are positioned on the frame 12 by being bolted into vertical slots, so as to allow for adjustment of height of the frame, and thus the cutting height. The wheels 20 are mounted, one to each of the axles 34 of the two hydraulic motors 32, so that the wheels rotate with the axles. Each hydraulic motor 32 is in fluid communication with its respective pump 28 by means of hoses 36. The amount and direction of flow of hydraulic fluid between each respective pump 28 and hydraulic motor 32 is controlled by operator controls 38, mounted in this embodiment to a rear portion 40 of frame 12. Thus, as different amounts of hydraulic fluid are directed to the different motors, the wheels rotate at different speeds, causing the mower to turn.

One embodiment of the operator controls 38 includes a pair of control levers 39, one for each respective pump 28 and hydraulic motor 32, which levers are spring loaded to return to a position corresponding to neutral when released. In this embodiment each lever 39 has an upright component and a generally horizontal component, joined by a smooth bend, so that they extend in front of the operator. Pushing both levers 39 forward causes the mower 10 to move forward. Pulling both levers 39 to the rear causes the mower 10 to move backward. Pushing one lever forward while pulling the other lever toward the rear, or not pushing the second lever as far forward, causes the mower to turn. If the one lever is forward and the other to the rear to the same extent, each wheel will rotate at the same RPM, but in opposite directions, and the mower 10 rotates about the center point between the two wheels. This effect is usually referred to as the mower having a zero turning radius. When both levers 38 are released, the wheels stop rotation due to dynamic braking, and the mower travel comes to a stop nearly instantly. A stationary horizontal bar 41 is affixed to frame 12 so as to be positioned forward of the levers 38, to provide a stable and fixed frame of reference for the hands to smoothly control the levers. In conventional seated riding mowers, this frame of reference is provided by the seat itself, or the seat arm rests, or possibly the knees of the rider, whereas in conventional walk-behind mowers this frame of reference had been missing, and so these types of control levers movable forward and rearward were not practical. Prior walk-behind mowers such as those shown in the Berrios '733 patent and in Scag, U.S. Pat. Nos. 4,967,543 and 4,991,382 disclosed pistol grip type controls where the movement was more vertical or up-and-down, rather than the horizontal or forward-and-back movement of the controls 38.

As indicated above, the lawn mower 10 is provided with a mower deck 18. One or more grass cutting blades 42 are positioned within the mower deck 18, and are driven by the engine 16 by any suitable means 44, such as a generally conventional belt arrangement. Here again see Berrios, U.S. Pat. No. 4,920,733, which is incorporated herein by reference in its entirety, for an example of such a belt arrangement for powering a lawn mower blade from an engine.

The invention provides a platform 44, pivotably attached to the frame 12 to the rear of the center of the rear wheels 20. In the embodiment shown in the drawing figures, the platform 44 has at least two positions, a deployed position as shown in solid lines in the drawing figures, wherein the platform is substantially flat, and a stowed position, as shown in phantom in FIGS. 1 and 3, wherein the platform is substantially vertical, in effect folded up out of the way. The platform 44 is formed of sufficient materials, and is sufficiently sturdy, to support the weight of an operator standing on the platform, as shown in FIG. 2. As shown in more detail in FIG. 3, the platform 44 is mounted to the frame 12 by means of a pivot pin 46. Pin 46 provides the single axis about which the platform pivots when moving between its two positions. In order to limit the horizontal or "down" position of the platform 44, an arcuate slot 48 is provided in each side of the platform, aligned with a support peg 50 on the frame 12. With the platform 44 moved so that the peg 50 is in the uppermost end of the slot 48, the platform is in its deployed or "down" position, and with the platform moved so that the peg is in the lowermost end of the slot, the platform is in its stowed or "up" position.

To make using the platform 44 even more convenient, a spring 52 may be provided to bias the platform to, or at least toward, its stowed position. The platform 44 then will move to its stowed position as soon as the operator steps off. Finally, in the embodiment shown in FIG. 3, an interlock, such as a switch 54, is provided. The switch 54 coacts with the spring 52 so that, as soon as the operator steps off the platform 44, the platform pivots upward, actuating the switch. The switch 54 is connected to the controls of the lawn mower 10 so that, when the switch is contacted, the mower stops. The mower stopping could be brought about by a number of effects caused by the switch 54. For example, the switch 54 could be a simple ignition kill switch. As another example, the switch 54 could be connected to the drive means 27 so that the mower simply stops its forward motion when the switch is contacted. Alternatively, the switch 54 could be connected to the blade drive mechanism 44, so that contacting the switch would have the effect of stopping the rotation of the blades 42. And these are just a few examples of the effect that could be given to interlock switch 54. It could clearly be used to bring about any suitable effect.

The invention provides that all of the parts, the platform 44, the engine 16, the deck 18, the wheels 20, 22, the wheel drive means 27, and all of the other parts, be connected to the frame 12 in such a way, and positioned on the frame, so that the center of gravity of the lawn mower 10 moves by no more than twenty-five percent of the wheelbase when an average-sized operator mounts or dismounts the lawn mower. That is, it is clear that the lawn mower 10 has a certain center of gravity when no one is standing on the platform 44. This center of gravity is represented in FIG. 1 by an arrow 56. As shown in FIG. 2, when the operator 58 mounts the lawn mower 10, the center of gravity shifts toward the rear of the machine, as represented by an arrow 60. The inventors have found that if this shift is less than twenty-five percent of the wheelbase of the lawn mower 10, the operating characteristics are not substantially adversely affected. Alternatively, as stated earlier, in order to maintain the expected standard of maneuverability in lawn mowers such as these, it is known that the weight distribution of the lawn mower should be no more than thirty-five percent on the front caster wheels, and no less than twenty percent.

To state a specific example of a lawn mower constructed according to this invention, the following terms are defined as indicated:

Wm=total weight of the mower 10.

Wo=weight of operator 58.

Wr=ground load (arrow 62) at rear drive wheels.

Wf=ground load (arrow 64) at front caster wheels.

CG=distance of center of gravity of machine to the rear wheel axle.

A=distance from the centerline of operator to rear wheel axle.

B=distance from front caster wheel axle to rear wheel axle.

The product of weight times distance equals moment. All moments are taken about the rear wheels and the sum must equal zero.

For this example, the lawn mower 10 weighs about 600 pounds, with a wheelbase of about 38 inches. Therefore:

Wm=600 lbs.

Wf=200 lbs.

Wr=400 lbs.

B=38 inches

In this design, 200/600 or 33% of the weight of the machine is on the front caster wheels.

To calculate the location of the center of gravity without an operator, that is, with the mower 10 as shown in FIG. 1, the following calculations are made:

$$Wm \times CG - Wf \times B = 0$$

$$CG = Wf \times B / Wm$$

$$CG = 200 \times 38 / 600$$

CG=12.7 inches forward of the rear axle

Now when an operator steps on the platform as shown in FIG. 2, as indicated above, it is necessary to maintain the location of the center of gravity as close as possible to the original location, so as not to make the front wheel loading too light nor too heavy. This limits the distance "A" that an operator standing on a platform may be located to the rear of the rear wheel axle. It is obvious that if the operator were positioned directly over the center of gravity, there would be no change in the location of the center of gravity and no change in the stability of the machine. However, this is not a practical constraint, recognizing the spacing required for the various components of the machine, such as the controls, wheels, engine, pumps and motors, plus clearance for the operator, and not result in an excessively long wheelbase, and recognizing in general that the machine under consideration is intended to be easily convertible between a walk-behind mower and a stand-up riding mower.

With a 200 pound operator standing 6 inches behind the rear wheel axle on the platform 44 of the lawn mower 10 constructed according to this invention, the following example is illustrated:

Wo=200 lbs.

A=6 inches

The calculation for the new location of the new center of gravity with an operator standing on the platform as shown in FIG. 2 is as follows:

$$(Wo+Wm) \times CGnew = Wm \times CG - Wo \times A$$

$$CGnew = (Wm \times CG - Wo \times A)/(Wo+Wm)$$

$$CGnew = (600 \times 12.7 - 200 \times 6)/(600+200)$$

CGnew=8 inches forward of the rear axle

This means of course that the center of gravity was shifted to the rear 4.7 inches with the addition of an operator standing on the platform. The new loading at the front caster wheels, with an operator standing on the platform, would be calculated as follows:

$$(Wm+Wo) \times Cgnew - Wf \times B = 0$$

$$Wf = (Wm+Wo) \times CGnew/B$$

$$Wf = (600+200) \times 8/38$$

Wf=170 lbs.

Now there is 170/800 or about 22% of the total weight on the front caster wheels.

This design maintains the desired safety and stability, yet with substantially improved usefulness and functionality over the conventional walk-behind lawn mower and over the conventional riding mower.

While the apparatus hereinbefore described is effectively adapted to fulfill the aforesaid objects, it is to be understood that the invention is not intended to be limited to the specific preferred embodiments of lawn mower set forth above. Rather, it is to be taken as including all reasonable equivalents to the subject matter of the appended claims.

We claim:

1. A powered lawn mower comprising:

a frame;

a prime mover mounted to the frame;

at least one front wheel and at least one non-swingable rear wheel supporting the frame above the ground, the distance between the front and rear wheels constituting the wheelbase of the mower;

means for transmitting rotational power from the prime mover to at least one of the wheels;

means for cutting grass associated with the frame, and powered by the prime mover;

a platform, positioned above the ground behind the at least one rear wheel, capable of supporting the entire weight of an operator while the lawn mower is operating;

the platform, the grass cutting means, the transmitting means, the wheels and the prime mover being connected to the frame in such a way and positioned so that the addition of the operator moves the center of gravity by no more than twenty-five percent of the wheelbase of the mower; and wherein the at least one rear wheel is mounted to the frame and rotatable about an axis, the axis being movable only in a vertical direction with respect to the frame.

2. A powered lawn mower as recited in claim 1 wherein the platform is pivotably mounted to the lawn mower.

3. A powered lawn mower as recited in claim 1 wherein the platform is pivotably mounted to the lawn mower, and pivots between a stowed position and a deployed position.

4. A powered lawn mower as recited in claim 3 wherein the platform is mounted to the frame and pivots about a single axis.

5. A powered lawn mower as recited in claim 1 wherein the transmitting means transmits power to the at least one rear wheel, and wherein the at least one front wheel is mounted so as to be swivelable about a vertical axis.

6. A powered lawn mower comprising:

a frame;

a prime mover mounted to the frame;

at least one front wheel and at least one non-swingable rear wheel supporting the frame above the ground, the distance between the front and rear wheels constituting the wheelbase of the mower;

means for transmitting rotational power from the prime mover to at least one of the wheels;

means for cutting grass associated with the frame, and powered by the prime mover;

a platform, positioned above the ground behind the at least one rear wheel, capable of supporting the entire weight of an operator while the lawn mower is operating;

the platform, the grass cutting means, the transmitting means, the wheels and the prime mover being connected to the frame in such a way and positioned so that the addition of the operator moves the center of gravity by no more than twenty-five percent of the wheelbase of the mower;

wherein the platform is pivotably mounted to the lawn mower and pivots between a stowed position and a deployed position; and means for biasing the platform toward the stowed position.

7. A powered lawn mower comprising:

a frame;

a prime mover mounted to the frame;

at least one front wheel and at least one non-swingable rear wheel supporting the frame above the ground, the distance between the front and rear wheels constituting the wheelbase of the mower;

means for transmitting rotational power from the prime mover to at least one of the wheels;

means for cutting grass associated with the frame, and powered by the prime mover;

a platform, positioned above the ground behind the at least one rear wheel, capable of supporting the entire weight of an operator while the lawn mower is operating;

the platform, the grass cutting means, the transmitting means, the wheels and the prime mover being connected to the frame in such a way and positioned so that the addition of the operator moves the center of gravity by no more than twenty-five percent of the wheelbase of the mower;

wherein the platform is pivotably mounted to the lawn mower and pivots between a stowed position and a deployed position; and an interlock, causing at least one of the grass cutting means and the ground travel of the mower to stop if the platform moves more than a predetermined amount away from the deployed position.

8. A powered lawn mower comprising:

a frame;

a prime mover mounted to the frame;

at least one front wheel and at least one non-swingable rear wheel supporting the frame above the ground, the distance between the front and rear wheels constituting the wheelbase of the mower;

means for transmitting rotational power from the prime mover to at least one of the wheels;

means for cutting grass associated with the frame, and powered by the prime mover;

a platform, positioned above the ground behind the at least one rear wheel, capable of supporting the entire weight of an operator while the lawn mower is operating;

the platform, the grass cutting means, the transmitting means, the wheels and the prime mover being connected to the frame in such a way and positioned so that the addition of the operator moves the center of gravity by no more than twenty-five percent of the wheelbase of the mower;

wherein the platform is pivotably mounted to the lawn mower and pivots between a stowed position and a deployed position; and an interlock, causing at least one of the grass cutting means and the ground travel of the mower to stop if the platform moves from the deployed position to the stowed position.

9. Powered lawn mowing apparatus, comprising in combination:

a frame;

a prime mover mounted to the frame;

at least one front wheel and at least one non-swingable rear wheel supporting the frame above the ground;

means for transmitting rotational power from the prime mover to at least one of the wheels;

means for cutting grass associated with the frame, and powered by the prime mover;

a platform, positioned above the ground and behind the at least one rear wheel, capable of supporting the entire weight of an operator while the mowing apparatus is operating;

the mowing apparatus having a certain total weight at any one moment;

the platform, the grass cutting means, the transmitting means, the wheels and the prime mover being connected to the frame in such a way and positioned so that the total weight of the mowing apparatus is distributed no more than thirty-five percent on the front wheel or wheels with no operator on the platform, and the total weight of the mowing apparatus is no less than twenty percent on the front wheel or wheels with an average operator riding on the platform; and wherein the at least one rear wheel is mounted to the frame and rotatable about an axis, the axis being movable only in a vertical direction with respect to the frame.

10. An apparatus as recited in claim 9 wherein the platform is pivotably mounted to the lawn mower.

11. An apparatus as recited in claim 9 wherein the platform is pivotably mounted to the lawn mower, and is capable of pivoting between a stowed position and a deployed position.

12. An apparatus as recited in claim 11 wherein the platform is mounted to the frame and pivots about a single axis.

13. An apparatus as recited in claim 9 wherein the transmitting means transmits power to the at least one rear wheel, and wherein the at least one front wheel is mounted so as to be swivelable about a vertical axis.

14. Powered lawn mowing apparatus, comprising in combination:
   a frame;
   a prime mover mounted to the frame;
   at least one front wheel and at least one non-swingable rear wheel supporting the frame above the ground;
   means for transmitting rotational power from the prime mover to at least one of the wheels;
   means for cutting grass associated with the frame, and powered by the prime mover;
   a platform, positioned above the ground and behind the at least one rear wheel, capable of supporting the entire weight of an operator while the mowing apparatus is operating;
   the mowing apparatus having a certain total weight at any one moment;
   the platform the grass cutting means, the transmitting means, the wheels and the prime mover being connected to the frame in such a way and positioned so that the total weight of the mowing apparatus is distributed no more than thirty-five percent on the front wheel or wheels with no operator on the platform, and the total weight of the mowing apparatus is no less than twenty percent on the front wheel or wheels with an average operator riding on the platform;
   wherein the platform is pivotably mounted to the lawn mower, and is capable of pivoting between a stowed position and a deployed position; and
   means for biasing the platform toward the stowed position.

15. Powered lawn mowing apparatus, comprising in combination:
   a frame;
   a prime mover mounted to the frame;
   at least one front wheel and at least one non-swingable rear wheel supporting the frame above the ground;
   means for transmitting rotational power from the prime mover to at least one of the wheels;
   means for cutting grass associated with the frame, and powered by the prime mover;
   a platform, positioned above the ground and behind the at least one rear wheel, capable of supporting the entire weight of an operator while the mowing apparatus is operating;
   the mowing apparatus having a certain total weight at any one moment;
   the platform the grass cutting means, the transmitting means, the wheels and the prime mover being connected to the frame in such a way and positioned so that the total weight of the mowing apparatus is distributed no more than thirty-five percent on the front wheel or wheels with no operator on the platform, and the total weight of the mowing apparatus is no less than twenty percent on the front wheel or wheels with an average operator riding on the platform;
   wherein the platform is pivotably mounted to the lawn mower, and is capable of pivoting between a stowed position and a deployed position; and
   an interlock, causing at least one of the grass cutting means and the ground travel of the mower to stop if the platform moves more than a predetermined amount away from the deployed position.

16. Powered lawn mowing apparatus, comprising in combination:
   a frame;
   a prime mover mounted to the frame;
   at least one front wheel and at least one non-swingable rear wheel supporting the frame above the ground;
   means for transmitting rotational power from the prime mover to at least one of the wheels;
   means for cutting grass associated with the frame, and powered by the prime mover;
   a platform, positioned above the ground and behind the at least one rear wheel, capable of supporting the entire weight of an operator while the mowing apparatus is operating;
   the mowing apparatus having a certain total weight at any one moment;
   the platform, the grass cutting means, the transmitting means, the wheels and the prime mover being connected to the frame in such a way and positioned so that the total weight of the mowing apparatus is distributed no more than thirty-five percent on the front wheel or wheels with no operator on the platform, and the total weight of the mowing apparatus is no less than twenty percent on the front wheel or wheels with an average operator riding on the platform;
   wherein the platform is pivotably mounted to the lawn mower, and is capable of pivoting between a stowed position and a deployed position; and
   an interlock, causing at least one of the grass cutting means and the ground travel of the mower to stop if the platform moves from the deployed position to the stowed position.

17. In a powered lawn mower having a frame, an internal combustion engine mounted to the frame, two swivelable front wheels and two non-swingable rear wheels supporting the frame, drive means for transmitting rotational power from the prime mover to at least one of the wheels, and a grass cutting blade rotatable mounted within a mower deck of the frame and powered by the engine, the improvement comprising:
   a platform, positioned above the ground and behind the rear axle, capable of supporting the entire weight of an operator while the lawn mower is operating;
   the platform, the mower deck, the drive means, the wheels and the engine being connected to the frame in such a way and positioned with respect to each other so that the addition of an average operator's weight on the platform moves the center of gravity by no more than twenty-five percent of the wheelbase of the mower; and
   wherein the rear wheels are mounted to the frame and rotatable about a single axis; the axis being movable only vertically with respect to the frame.

18. A lawn mower as recited in claim 17 wherein the platform is pivotably mounted to the frame.

19. A lawn mower as recited in claim 17 wherein the platform is pivotably mounted to the frame, and pivots between a stowed position and a deployed position.

20. A lawn mower as recited in claim 19 wherein the platform is mounted to the frame and pivots about a single axis.

21. In a powered lawn mower having a frame, an internal combustion engine mounted to the frame, two swivelable front wheels and two non-swingable rear wheels supporting the frame, drive means for transmitting rotational power from the prime mover to at least one of the wheels, and a grass cutting blade rotatable mounted within a mower deck of the frame and powered by the engine, the improvement comprising:

- a platform, positioned above the ground and behind the rear axle, capable of supporting the entire weight of an operator while the lawn mower is operating;
- the platform, the mower deck, the drive means, the wheels and the engine being connected to the frame in such a way and positioned with respect to each other so that the addition of an average operator's weight on the platform moves the center of gravity by no more than twenty-five percent of the wheelbase of the mower;
- wherein the platform is pivotably mounted to the frame and pivots between a stowed position and a deployed position; and
- means for biasing the platform toward the stowed position.

22. In a powered lawn mower having a frame, an internal combustion engine mounted to the frame, two swivelable front wheels and two non-swingable rear wheels supporting the frame, drive means for transmitting rotational power from the prime mover to at least one of the wheels, and a grass cutting blade rotatably mounted within a mower deck of the frame and powered by the engine, the improvement comprising:

- a platform, positioned above the ground and behind the rear axle, capable of supporting the entire weight of an operator while the lawn mower is operating;
- the platform, the mower deck, the drive means, the wheels and the engine being connected to the frame in such a way and positioned with respect to each other so that the addition of an average operator's weight on the platform moves the center of gravity by no more than twenty-five percent of the wheelbase of the mower;
- wherein the platform is pivotably mounted to the frame and pivots between a stowed position and a deployed position; and
- an interlock, causing at least one of the grass cutting means and the ground travel of the mower to stop if the platform moves more than a predetermined amount away from the deployed position.

23. In a powered lawn mower having a frame, an internal combustion engine mounted to the frame, two swivelable front wheels and two non-swingable rear wheels supporting the frame, drive means for transmitting rotational power from the prime mover to at least one of the wheels, and a grass cutting blade rotatably mounted within a mower deck of the frame and powered by the engine, the improvement comprising:

- a platform, positioned above the ground and behind the rear axle, capable of supporting the entire weight of an operator while the lawn mower is operating;
- the platform, the mower deck, the drive means, the wheels and the engine being connected to the frame in such a way and positioned with respect to each other so that the addition of an average operator's weight on the platform moves the center of gravity by no more than twenty-five percent of the wheelbase of the mower;
- wherein the platform is pivotably mounted to the frame and pivots between a stowed position and a deployed position; and
- an interlock, causing at least one of the grass cutting means and the ground travel of the mower to stop if the platform moves from the deployed position to the stowed position.

24. A powered lawn mower comprising:

- a frame;
- a prime mover mounted to the frame;
- at least one front wheel and at least one non-swingable rear wheel supporting the frame above the ground, the distance between the front and rear wheels constituting the wheelbase of the mower;
- means for transmitting rotational power from the prime mover to at least one of the wheels;
- means for cutting grass associated with the frame, and powered by the prime mover;
- a platform, positioned above the ground and behind the at least one rear wheel, capable of supporting an operator while the lawn mower is operating, and mounted to the frame so as to be pivotable about a single axis between a deployed position and a stowed position; and
- wherein the at least one rear wheel is mounted to the frame and rotatable about an axis, the axis being movable only in a vertical direction with respect to the frame.

25. A powered lawn mower as recited in claim 24 wherein the platform, the grass cutting means, the transmitting means, the wheels and the prime mover are connected to the frame in such a way and positioned so that the addition of the operator moves the center of gravity by no more than twenty-five percent of the wheelbase of the mower.

26. A powered lawn mower as recited in claim 24 wherein the platform, the grass cutting means, the transmitting means, the wheels and the prime mover are connected to the frame in such a way and positioned so that the total weight of the mower is distributed no more than thirty-five percent on the front wheel or wheels with no operator on the platform, and the total weight of the mower is no less than twenty percent on the front wheel or wheels with an average operator riding on the platform.

27. A powered lawn mower comprising:

- a frame;
- a prime mover mounted to the frame; p1 at least one front wheel and at least one non-swingable rear wheel supporting the frame above the ground, the distance between the front and rear wheels constituting the wheelbase of the mower;
- means for transmitting rotational power from the prime mover to at least one of the wheels;
- means for cutting grass associated with the frame, and powered by the prime mover;
- a platform, positioned above the ground and behind the at least one rear wheel, capable of supporting an operator while the lawn mower is operating, and mounted to the frame so as to be pivotable about a single axis between a deployed position and a stowed position; and
- means for biasing the platform toward the stowed position.

28. A powered lawn mower as recited in claim 27, further comprising an interlock, causing at least one of the grass cutting means and the ground travel of the mower to stop if the platform moves more than a predetermined amount away from the deployed position.

29. A powered lawn mower as recited in claim 27 further comprising an interlock, causing at least one of the grass cutting means and the ground travel of the mower to stop if the platform moves from the deployed position to the stowed position.

* * * * *